US012683755B2

(12) United States Patent
Hong et al.

(10) Patent No.: US 12,683,755 B2
(45) Date of Patent: Jul. 14, 2026

(54) INFORMATION ACQUISITION METHOD

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 364 days.

(21) Appl. No.: 18/567,570

(22) PCT Filed: Jun. 9, 2021

(86) PCT No.: PCT/CN2021/099259
§ 371 (c)(1),
(2) Date: Dec. 6, 2023

(87) PCT Pub. No.: WO2022/257054
PCT Pub. Date: Dec. 15, 2022

(65) Prior Publication Data
US 2025/0125939 A1 Apr. 17, 2025

(51) Int. Cl.
*H04L 5/14* (2006.01)
*H04W 24/08* (2009.01)

(52) U.S. Cl.
CPC ........... *H04L 5/1438* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 12,095,534 | B2 * | 9/2024 | Huang | ................... H04W 72/23 |
| 2011/0096723 | A1 * | 4/2011 | Aoyama | ............... H04W 76/12 370/328 |
| 2014/0328228 | A1 | 11/2014 | Park et al. | |
| 2016/0323088 | A1 * | 11/2016 | Beale | ......................... H04L 5/16 |
| 2018/0159584 | A1 * | 6/2018 | Zhang | ....................... H04L 5/14 |
| 2019/0141578 | A1 * | 5/2019 | Tang | ..................... H04W 28/18 |
| 2021/0152418 | A1 * | 5/2021 | Abdelghaffar | ....... H04B 7/0602 |

(Continued)

FOREIGN PATENT DOCUMENTS

| | | |
|---|---|---|
| CN | 110022592 A | 7/2019 |
| CN | 110115063 A | 8/2019 |

(Continued)

OTHER PUBLICATIONS

PCT/CN2021/099259 International Search Report dated Mar. 10, 2022, 2 pages.

(Continued)

*Primary Examiner* — Brian S Roberts
(74) *Attorney, Agent, or Firm* — Cozen O'Connor

(57) ABSTRACT
An information acquisition method, applied to a network device is provided. The method includes receiving first indication information sent by a first terminal device, in which the first indication information is configured to indicate to the network device that the first terminal device has recorded full duplex information. The recorded full duplex information may be information about the network device supporting a full duplex communication, which is measured and recorded based on a configuration requirement of the network device when the first terminal device is in an idle state.

18 Claims, 3 Drawing Sheets receiving first indication information sent by a first terminal device, in which the first indication information is configured to indicate to the network device that the first terminal device has recorded full duplex information — S301 indicating the first terminal device to report full duplex information required by the network device, in response to the first indication information received — S302 receiving reported information sent by the first terminal device based on the indication — S303

(56)                    References Cited

U.S. PATENT DOCUMENTS

| | | | |
|---|---|---|---|
| 2022/0167148 A1* | 5/2022 | Kim | H04L 25/0204 |
| 2023/0370240 A1* | 11/2023 | Abotabl | H04W 72/23 |

FOREIGN PATENT DOCUMENTS

| | | |
|---|---|---|
| WO | WO 2018127290 A1 | 7/2018 |
| WO | WO 2019190994 A1 | 10/2019 |
| WO | WO 2019242712 A1 | 12/2019 |

OTHER PUBLICATIONS

European Patent Application No. 21944564.0 Search and Opinion dated Mar. 11, 2025, 11 pages.
Chinese Patent Application No. 202180001793.7, Office Action with English translation dated May 30, 2025, 19 pages.

\* cited by examiner receiving first indication information sent by a first terminal device, in which the first indication information is configured to indicate to the network device that the first terminal device has recorded full duplex information

S201

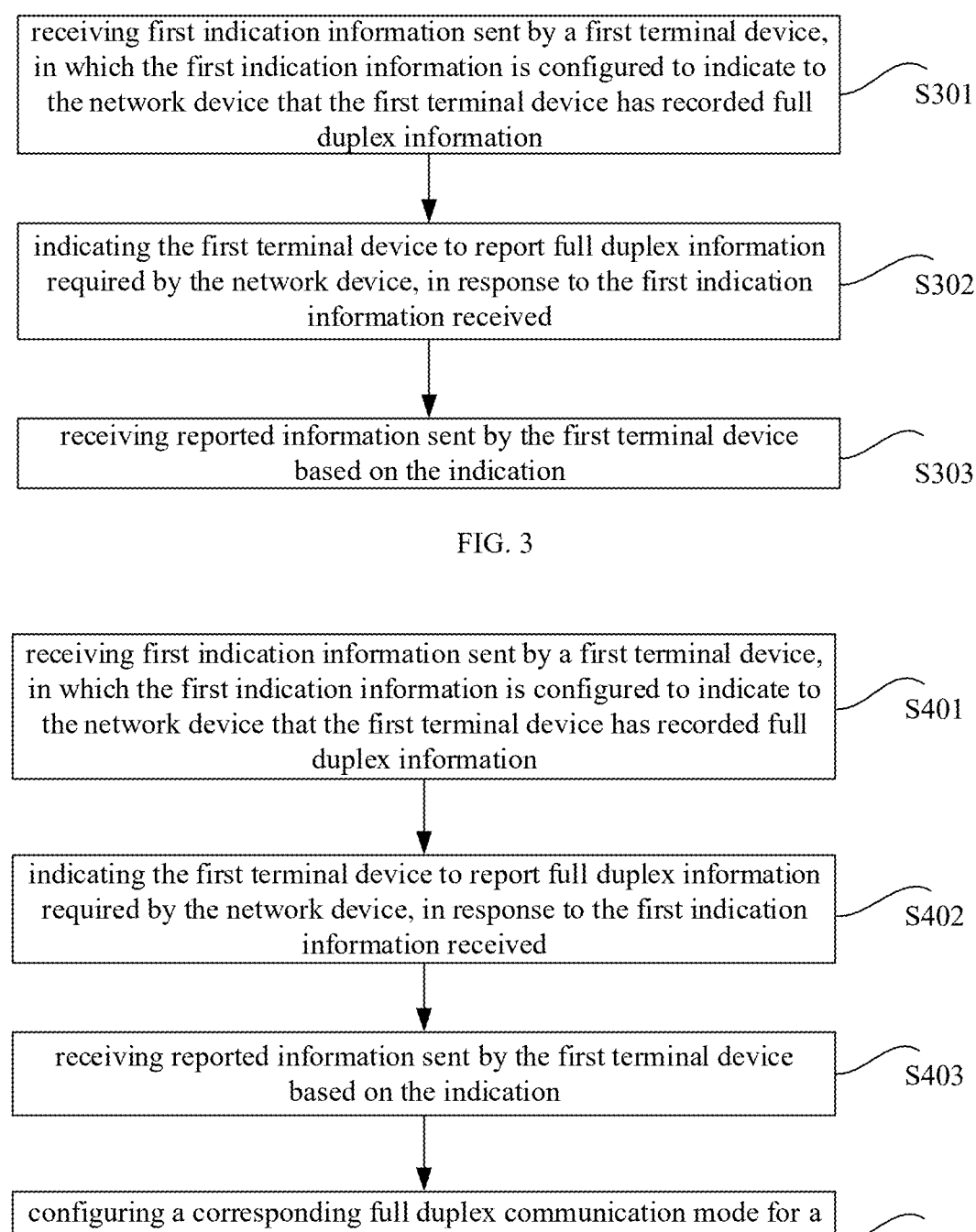

receiving first indication information sent by a first terminal device, in which the first indication information is configured to indicate to the network device that the first terminal device has recorded full duplex information — S301 indicating the first terminal device to report full duplex information required by the network device, in response to the first indication information received — S302 receiving reported information sent by the first terminal device based on the indication — S303

FIG. 3 receiving first indication information sent by a first terminal device, in which the first indication information is configured to indicate to the network device that the first terminal device has recorded full duplex information — S401 indicating the first terminal device to report full duplex information required by the network device, in response to the first indication information received — S402 receiving reported information sent by the first terminal device based on the indication — S403 configuring a corresponding full duplex communication mode for a second terminal device served by the network device according to the reported information — S404

FIG. 4 indicating to a first network device that the terminal device has recorded full duplex information, in a process of establishing a connection with the first network device — S501

FIG. 5

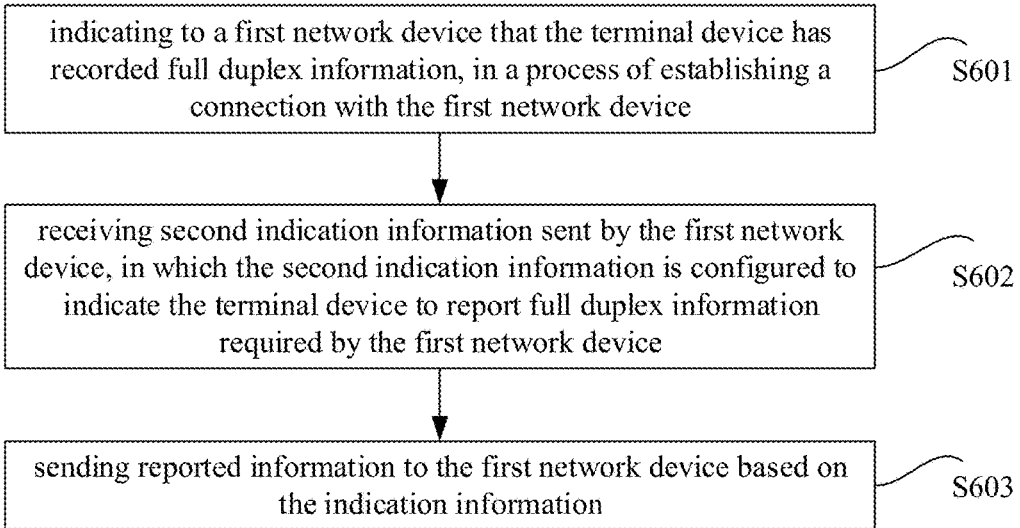

indicating to a first network device that the terminal device has recorded full duplex information, in a process of establishing a connection with the first network device — S601 receiving second indication information sent by the first network device, in which the second indication information is configured to indicate the terminal device to report full duplex information required by the first network device — S602 sending reported information to the first network device based on the indication information — S603

FIG. 6

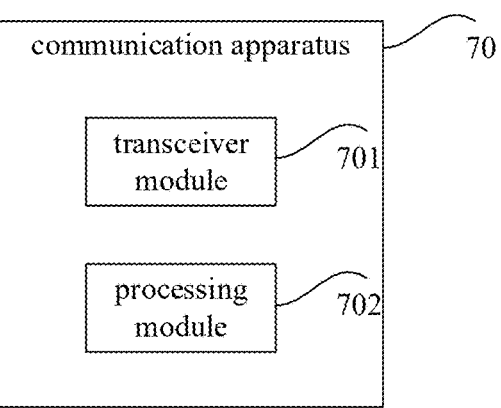

communication apparatus — 70 transceiver module — 701 processing module — 702

FIG. 7

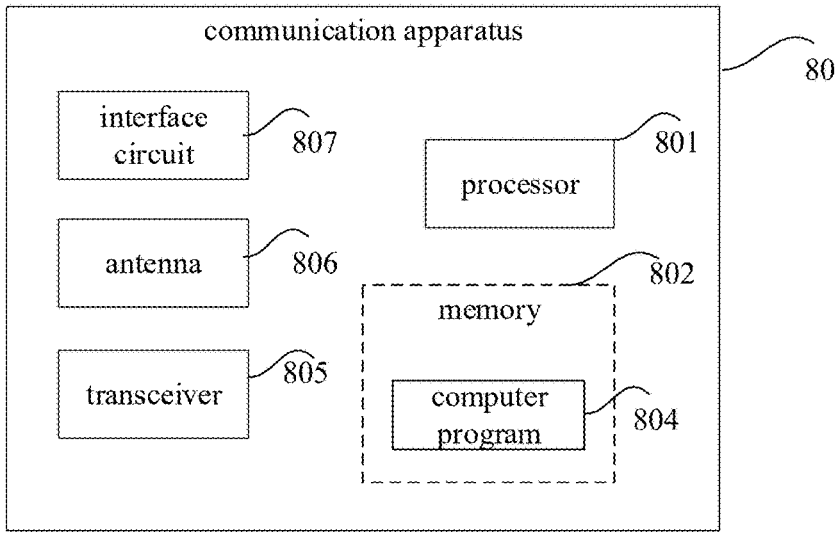

communication apparatus — 80 interface circuit — 807 antenna — 806 transceiver — 805 processor — 801 memory — 802 computer program — 804

FIG. 8

INFORMATION ACQUISITION METHOD

CROSS-REFERENCE TO RELATED APPLICATION

This application is a U.S. national phase application of International Patent Application No. PCT/CN2021/099259, filed on Jun. 9, 2021, the entire contents of which are incorporated herein by reference.

FIELD

The present disclosure relates to the field of wireless communication technologies, and more particularly to an information acquisition method.

BACKGROUND

Mobile Internet and Internet of Things, as two major driving forces for the development of mobile communication in the future, provide a wide range of application scenarios for the 5th generation mobile communication technology (5G). In order to meet requirements of more diverse services, higher rates, and larger number of connections in future cellular networks, a cellular network (such as a 5G network) needs to significantly improve spectral efficiency. A full duplex technology may be an important candidate for improving spectral efficiency in the cellular network (such as the 5G network).

The full duplex technology means that a mutual transmission of wireless services between a near-end device and a remote-end device occurs at the same time and over a same frequency bandwidth. Theoretically, frequency efficiency may be doubled as compared with an existing time division duplex technology and a frequency division duplex technology. If full duplex technology is applied in cellular networking, however, it may cause serious interference problems.

SUMMARY

In a first aspect, an embodiment of the present disclosure provides an information acquisition method, applied to a network device, and the method includes receiving first indication information sent by a first terminal device, in which the first indication information is configured to indicate to the network device that the first terminal device has recorded full duplex information.

In a second aspect, an embodiment of the present disclosure provides another information acquisition method, applied to a terminal device, and the method includes indicating to a first network device that the terminal device has recorded full duplex information, in a process of establishing a connection with the first network device.

In a third aspect, an embodiment of the present disclosure provides a communication device. The communication device includes a processor that, when invoking a computer program in a memory, cause the method described in the first aspect to be implemented.

BRIEF DESCRIPTION OF THE DRAWINGS

In order to more clearly illustrate technical solutions in embodiments of the present disclosure or the background, the following description will be given to the accompanying drawings, which are needed to be used in the embodiments of the present disclosure or the background.

FIG. 3 is a flow chart of another information acquisition method provided in an embodiment of the present disclosure.

FIG. 4 is a flow chart of another information acquisition method provided in an embodiment of the present disclosure.

FIG. 5 is a flow chart of a information acquisition method applied to a terminal device as provided in an embodiment of the present disclosure.

FIG. 6 is a flow chart of another information acquisition method provided in an embodiment of the present disclosure.

FIG. 7 is a schematic diagram of a communication apparatus provided in an embodiment of the present disclosure.

FIG. 8 is a schematic diagram of another communication apparatus provided in an embodiment of the present disclosure.

DETAILED DESCRIPTION

Figures 1, 2:
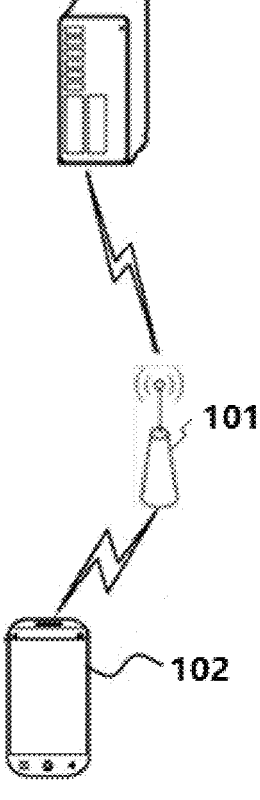
FIG. 1 is a schematic diagram of a communication system provided in an embodiment of the present disclosure.
FIG. 2 is a flow chart of an information acquisition method applied to a network device as provided in an embodiment of the present disclosure.

Embodiments of the present disclosure are described in detail below, examples of which are illustrated in the accompanying drawings. The same or similar reference numerals represent the same or similar elements or elements having the same or similar functions throughout the descriptions. The embodiments described below with reference to the accompanying drawings are illustrative, and are intended to explain the present disclosure and cannot be construed as limiting the present disclosure.

In order to better understand an information acquisition method disclosed in an embodiment of the present disclosure, a communication system used in the embodiment of the present disclosure is firstly described below.

Referring to FIG. 1, FIG. 1 is a schematic diagram of a communication system provided in an embodiment of the present disclosure. The communication system may include, but is not limited to, one network device, and one terminal device. The number and form of devices shown in FIG. 1 are for illustration merely, and do not constitute a limitation of the embodiment of the present disclosure. In a practical application, the communication system may include two or more network devices, and two or more terminal devices. The communication system shown in FIG. 1 includes one network device 101 and one terminal device 102 as an example.

It is to be noted that the technical solution of the embodiment of the present disclosure may be applied to various communication systems, for example, a long term evolution (LTE) system, a 5th generation (5G) mobile communication system, a 5G new radio (NR) system, or other future new mobile communication systems, etc.

The network device 101 in the embodiment of the present disclosure is an entity on a network side for transmitting or receiving signals. For example, the network device 101 may be an evolved NodeB (eNB), a transmission reception point (TRP), a next generation NodeB (gNB) in an NR system, a base station in other future mobile communication systems, or an access node in a wireless fidelity (WiFi) system, etc. A specific technology and a specific device form adopted by the network device are not limited in the embodiment of the present disclosure. The network device provided in the embodiment of the present disclosure may be composed of a central unit (CU) and a distributed unit (DU). The CU may also be referred to as a control unit. A structure adopting a CU-DU may separate the network device, such as protocol layers of a base station, functions of part of the protocol layers are centralized controlled by the CU, functions of the remaining part or all of the protocol layers are distributed in the DU, and the DU is centrally controlled by the CU.

The terminal device 102 in the embodiment of the present disclosure is an entity on a user side configured to receive or transmitting signals, such as a mobile phone. A terminal may also be referred to as a terminal device, a user equipment (UE), a mobile station (MS), a mobile terminal (MT), and so on. The terminal may be a car with a communication function, a smart car, a mobile phone, a wearable device, a Pad, a computer with a wireless transceiver function, a virtual reality (VR) terminal, an augmented reality (AR) terminal, a wireless terminal in an industrial control, a wireless terminal in self-driving, a wireless terminal in a remote medical surgery, a wireless terminal in smart grid, a wireless terminal in transportation safety, a wireless terminal in a smart city, a wireless terminal in a smart home, etc. A specific technology and a specific device form adopted by the terminal are not limited in the embodiment of the present disclosure.

It may be understood that the communication system described in the embodiment of the present disclosure is to illustrate the technical solution of the embodiment of the present disclosure more clearly, and does not constitute a limitation of the technical solution provided in the embodiment of the present disclosure. It is known by those of ordinary skill in the art that with the evolution of a system architecture and the emergence of new business scenarios, the technical solution provided in the embodiment of the present disclosure is also applicable to similar technical problems.

An information acquisition method, an information acquisition apparatus, and a storage medium provided in the present disclosure will be described in detail with reference to the accompanying drawings.

Referring to FIG. 2, FIG. 2 is a flow chart of an information acquisition method provided in an embodiment of the present disclosure. It is to be noted that the information acquisition method in the embodiment of the present disclosure may be applied to a network device. The network device is a network device supporting a full duplex communication. As shown in FIG. 2, the information acquisition method may include, but is not limited to a step as follows.

In step S201, first indication information sent by a first terminal device is received, in which the first indication information is configured to indicate to the network device that the first terminal device has recorded full duplex information.

In some embodiments of the present disclosure, the recorded full duplex information may be information about the network device supporting a full duplex communication, which is measured and recorded based on a configuration requirement of the network device when the first terminal device is in an idle state. In an embodiment of the present disclosure, a network device that configures a configuration to perform measuring and recording for a full duplex for the first terminal device may be the network device that receives the first indication information sent by the first terminal device. Alternatively, in an embodiment of the present disclosure, a network device that configures a configuration to perform measuring and recording for a full duplex for the first terminal device may also be other surrounding network devices.

For example, the network device supporting the full duplex communication sends full duplex information supported by itself via system information, so that after receiving the system information, the first terminal device in the idle state reads the full duplex information supported by the network device from the system information, and records the full duplex information supported by the network device. Alternatively, the network device configures a configuration to perform measuring and recording for a full duplex for the first terminal device in a connected state. After receiving a signaling, the first terminal device in the connected state performs measuring and recording according to the configuration requirement of the network device after entering an idle state. In a subsequent process of establishing a connection with a certain network device, the first terminal device may indicate to the network device that the first terminal device has the recorded full duplex information. In this way, the network device may know that the first terminal device has the recorded full duplex information after receiving the indication sent by the first terminal device, so that the network device may know information about a surrounding network device supporting a full duplex communication, so as to configure an appropriate full duplex communication mode for the terminal device served by the network device and supporting a full duplex. The problem of interference caused by applying a full duplex technology to cellular networking may be solved, and spectral efficiency of a cellular network may also be improved.

Additionally, in an embodiment of the present disclosure, the recorded full duplex information at least includes information about the network device supporting a full duplex communication, or information about the network device supporting a full duplex communication and corresponding full duplex information, or information about the network device with a specific full duplex condition. The information about the network device may be understood as related information about the network device, such as an identification of the network device, etc. The full duplex information may be understood as full duplex communication mode information. The specific full duplex condition may be understood to at least include one or more of supporting a full duplex in one or more specified frequency bands, supporting a full duplex at one or more specified times, or supporting a full duplex in a specific mode, etc.

It is to be noted that, the system information used by the network device to send the full duplex information supported by the network device to the first terminal device may be minimum system information (minimum SI), or may also be other system information (other SI). As an example, the system information may be minimum SI, which may be propagated through a broadcast mechanism. The minimum SI usually includes very critical system information related to a cell selection and an initial access (including obtaining other SI). These system information need to be propagated in a periodic broadcast mode, so that information that needs to be broadcasted and sent is greatly compressed.

As another example, the system information may be other SI. For example, all the other system information except the minimum system information. The other system information is transmitted according to a request of the terminal device or a need of the network device, and may be transmitted by a dedicated signaling, broadcast, or multicast, instead of a continuous periodic transmission, so as to improve resource utilization efficiency.

It is to be noted that, in some embodiments of the present disclosure, the first terminal device may be a terminal device supporting a full duplex. In other embodiments of the present disclosure, the first terminal device may be a terminal device that does not support a full duplex, but may read system information sent by a network that includes full duplex information of the network device.

For example, assuming that the first terminal device is the terminal device supporting the full duplex. In this way, the network device configures a configuration to perform measuring and recording for a full duplex for the first terminal device in the connected state. After receiving the configuration, the first terminal device in the connected state may perform measuring and recording according to the configuration requirement of the network device after entering an idle state, so that the first terminal device records the full duplex information of the network device.

As another example, assuming that the first terminal device is the terminal device that does not support the full duplex, but may read the system information sent by the network that includes the full duplex information of the network device. In this way, the network device sends the full duplex information supported by itself via the system information. When receiving the system information including the full duplex information of the network device, the first terminal device may read the full duplex information supported by the network device from the system information.

By implementing the embodiment of the present disclosure, the terminal device may indicate to the network device that the terminal device has the recorded network device information supporting the full duplex communication, so that the network device may know the information about the surrounding network device supporting the full duplex communication, so as to configure the appropriate full duplex communication mode for the terminal device served by the network device and supporting the full duplex. The problem of interference caused by applying the full duplex technology to the cellular networking may be solved, and spectral efficiency of the cellular network may also be improved.

It is to be noted that, after receiving the indication sent by the first terminal device, the network device may indicate the first terminal device to report the full duplex information required by the network device according to a requirement of the network device. Additionally, referring to FIG. 3, FIG. 3 is a flow chart of another information acquisition method provided in an embodiment of the present disclosure. It is to be noted that the information acquisition method in the embodiment of the present disclosure may be applied to a network device, and the network device supports a full duplex communication. As shown in FIG. 3, the information acquisition method may include, but is not limited to steps as follows.

In step S301, first indication information sent by a first terminal device is received, in which the first indication information is configured to indicate to the network device that the first terminal device has recorded full duplex information.

In some embodiments of the present disclosure, the recorded full duplex information may be information about the network device supporting a full duplex communication, which is measured and recorded based on a configuration requirement of the network device when the first terminal device is in an idle state. In an embodiment of the present disclosure, a network device that configures a configuration to perform measuring and recording for a full duplex for the first terminal device may be the network device that receives the first indication information sent by the first terminal device. Alternatively, in an embodiment of the present disclosure, a network device that configures a configuration to perform measuring and recording for a full duplex for the first terminal device may also be other surrounding network devices.

For example, the network device supporting the full duplex communication sends full duplex information supported by itself via system information, so that after receiving the system information, the first terminal device in the idle state reads the full duplex information supported by the network device from the system information, and records the full duplex information supported by the network device. Alternatively, the network device configures a configuration to perform measuring and recording for a full duplex for the first terminal device in a connected state. After receiving a signaling, the first terminal device in the connected state performs measuring and recording according to the configuration requirement of the network device after entering an idle state. In a subsequent process of establishing a connection with a certain network device, the first terminal device may indicate to the network device that the first terminal device has the recorded full duplex information. In this way, the network device may know that the first terminal device has the recorded full duplex information after receiving the indication sent by the first terminal device, so that the network device may know information about a surrounding network device supporting a full duplex communication, so as to configure an appropriate full duplex communication mode for the terminal device served by the network device and supporting a full duplex. The problem of interference caused by applying a full duplex technology to cellular networking may be solved, and spectral efficiency of a cellular network may also be improved.

Additionally, in an embodiment of the present disclosure, the recorded full duplex information at least includes information about the network device supporting a full duplex communication, or information about the network device supporting a full duplex communication and corresponding full duplex information, or information about the network device with a specific full duplex condition. The information about the network device may be understood as related information about the network device, such as an identification of the network device, etc. The full duplex information may be understood as full duplex communication mode information. The specific full duplex condition may be understood to at least include one or more of supporting a full duplex in one or more specified frequency bands, supporting a full duplex at one or more specified times, or supporting a full duplex in a specific mode, etc.

It is to be noted that, the system information used by the network device to send the full duplex information supported by the network device to the first terminal device may be minimum system information (minimum SI), or may also be other system information (other SI). As an example, the system information may be minimum SI, which may be propagated through a broadcast mechanism. The minimum SI usually includes very critical system information related to a cell selection and an initial access (including obtaining other SI). These system information need to be propagated in a periodic broadcast mode, so that information that needs to be broadcasted and sent is greatly compressed.

As another example, the system information may be other SI. For example, all the other system information except the minimum system information. The other system information is transmitted according to a request of the terminal device or a need of the network device, and may be transmitted by a dedicated signaling, broadcast, or multicast, instead of a continuous periodic transmission, so as to improve resource utilization efficiency.

It is to be noted that, in some embodiments of the present disclosure, the first terminal device may be a terminal device supporting a full duplex. In other embodiments of the present disclosure, the first terminal device may be a terminal device that does not support a full duplex, but may read system information sent by a network that includes full duplex information of the network device.

For example, assuming that the first terminal device is the terminal device supporting the full duplex. In this way, the network device configures a configuration to perform measuring and recording for a full duplex for the first terminal device in the connected state. After receiving the configuration, the first terminal device in the connected state may perform measuring and recording according to the configuration requirement of the network device after entering an idle state, so that the first terminal device records the full duplex information of the network device.

As another example, assuming that the first terminal device is the terminal device that does not support the full duplex, but may read the system information sent by the network that includes the full duplex information of the network device. In this way, the network device sends the full duplex information supported by itself via the system information. When receiving the system information including the full duplex information of the network device, the first terminal device may read the full duplex information supported by the network device from the system information.

In step S302, the first terminal device is indicated to report full duplex information required by the network device, in response to the first indication information received.

In an embodiment of the present disclosure, after receiving the first indication information sent by the first terminal device, the network device may indicate the first terminal device to report the full duplex information required by the network device according to a requirement of the network device. As an example, this requirement may be understood as that the network device supports a full duplex in one or more specified frequency bands, or that the network device supports a full duplex at one or more specified times, or that the network device supports a full duplex in a specific mode, etc.

Additionally, in an embodiment of the present disclosure, the network device may indicate the first terminal device to report the full duplex information required by the network device via a first type of radio resource control (RRC) signaling message, according to a requirement of the network device. The first type of RRC signaling message may be added to a user equipment information request signaling message.

In step S303, reported information sent by the first terminal device based on the indication is received.

Additionally, after receiving the indication sent by the network device, the first terminal device may report the full duplex information according to the requirement of the network device, and the reported information may be transmitted via a user equipment information response signaling message.

By implementing the embodiment of the present disclosure, since the full duplex information is recorded in the terminal device, the network device may indicate the terminal device to report the full duplex information required by the network device, so that the terminal device may report the full duplex information to the network device based on the indication.

It is to be noted that, the network device may configure an appropriate full duplex communication mode for the terminal device served by the network device and supporting the full duplex according to the reported information of the first terminal device, so as to ensure a normal communication between the terminal device and the network device. Additionally, referring to FIG. 4, FIG. 4 is a flow chart of another information acquisition method provided in an embodiment of the present disclosure. It is to be noted that the information acquisition method in the embodiment of the present disclosure may be applied to a network device, and the network device supports a full duplex communication. As shown in FIG. 4, the information acquisition method may include, but is not limited to steps as follows.

In step S401, first indication information sent by a first terminal device is received, in which the first indication information is configured to indicate to the network device that the first terminal device has recorded full duplex information.

In some embodiments of the present disclosure, the recorded full duplex information may be information about the network device supporting a full duplex communication, which is measured and recorded based on a configuration requirement of the network device when the first terminal device is in an idle state. In an embodiment of the present disclosure, a network device that configures a configuration to perform measuring and recording for a full duplex for the first terminal device may be the network device that receives the first indication information sent by the first terminal device. Alternatively, in an embodiment of the present disclosure, a network device that configures a configuration to perform measuring and recording for a full duplex for the first terminal device may also be other surrounding network devices.

For example, the network device supporting the full duplex communication sends full duplex information supported by itself via system information, so that after receiving the system information, the first terminal device in the idle state reads the full duplex information supported by the network device from the system information, and records the full duplex information supported by the network device. Alternatively, the network device configures a configuration to perform measuring and recording for a full duplex for the first terminal device in a connected state. After receiving a signaling, the first terminal device in the connected state performs measuring and recording according to the configuration requirement of the network device after entering an idle state. In a subsequent process of establishing a connection with a certain network device, the first terminal device may indicate to the network device that the first terminal device has the recorded full duplex information. In this way, the network device may know that the first terminal device has the recorded full duplex information after receiving the indication sent by the first terminal device, so that the network device may know information about a surrounding network device supporting a full duplex communication, so as to configure an appropriate full duplex communication mode for the terminal device served by the network device and supporting a full duplex. The problem of interference caused by applying a full duplex technology to cellular networking may be solved, and spectral efficiency of a cellular network may also be improved.

Additionally, in an embodiment of the present disclosure, the recorded full duplex information at least includes information about the network device supporting a full duplex communication, or information about the network device supporting a full duplex communication and corresponding full duplex information, or information about the network device with a specific full duplex condition. The information about the network device may be understood as related information about the network device, such as an identification of the network device, etc. The full duplex information may be understood as full duplex communication mode information. The specific full duplex condition may be understood to at least include one or more of supporting a full duplex in one or more specified frequency bands, supporting a full duplex at one or more specified times, or supporting a full duplex in a specific mode, etc.

It is to be noted that, the system information used by the network device to send the full duplex information supported by the network device to the first terminal device may be minimum system information (minimum SI), or may also be other system information (other SI). As an example, the system information may be minimum SI, which may be propagated through a broadcast mechanism. The minimum SI usually includes very critical system information related to a cell selection and an initial access (including obtaining other SI). These system information need to be propagated in a periodic broadcast mode, so that information that needs to be broadcasted and sent is greatly compressed.

As another example, the system information may be other SI. For example, all the other system information except the minimum system information. The other system information is transmitted according to a request of the terminal device or a need of the network device, and may be transmitted by a dedicated signaling, broadcast, or multicast, instead of a continuous periodic transmission, so as to improve resource utilization efficiency.

It is to be noted that, in some embodiments of the present disclosure, the first terminal device may be a terminal device supporting a full duplex. In other embodiments of the present disclosure, the first terminal device may be a terminal device that does not support a full duplex, but may read system information sent by a network that includes full duplex information of the network device.

For example, assuming that the first terminal device is the terminal device supporting the full duplex. In this way, the network device configures a configuration to perform measuring and recording for a full duplex for the first terminal device in the connected state. After receiving the configuration, the first terminal device in the connected state may perform measuring and recording according to the configuration requirement of the network device after entering an idle state, so that the first terminal device records the full duplex information of the network device.

As another example, assuming that the first terminal device is the terminal device that does not support the full duplex, but may read the system information sent by the network that includes the full duplex information of the network device. In this way, the network device sends the full duplex information supported by itself via the system information. When receiving the system information including the full duplex information of the network device, the first terminal device may read the full duplex information supported by the network device from the system information.

In step S402, the first terminal device is indicated to report full duplex information required by the network device, in response to the first indication information received.

In an embodiment of the present disclosure, after receiving the first indication information sent by the first terminal device, the network device may indicate the first terminal device to report the full duplex information required by the network device according to a requirement of the network device. As an example, this requirement may be understood as that the network device supports a full duplex in one or more specified frequency bands, or that the network device supports a full duplex at one or more specified times, or that the network device supports a full duplex in a specific mode, etc.

Additionally, in an embodiment of the present disclosure, the network device may indicate the first terminal device to report the full duplex information required by the network device via a first type of radio resource control (RRC) signaling message, according to a requirement of the network device. The first type of RRC signaling message may be added to a user equipment information request signaling message.

In step S403, reported information sent by the first terminal device based on the indication is received.

Additionally, after receiving the indication sent by the network device, the first terminal device may report the full duplex information according to the requirement of the network device, and the reported information may be transmitted via a user equipment information response signaling message.

In step S404, a corresponding full duplex communication mode is configured for a second terminal device served by the network device according to the reported information.

In an embodiment of the present disclosure, the second terminal device may be a terminal device supporting a full duplex communication.

That is, after receiving reported full duplex information sent by the first terminal device, the network device may configure an appropriate full duplex communication mode for the terminal device served by the network device and supporting a full duplex communication according to the information. The full duplex communication mode may be to perform a full duplex communication in one or more specified frequency bands, or may be to perform a full duplex communication at one or more specified times, or may be to perform a full duplex communication in a specific mode.

By implementing the embodiment of the present disclosure, an appropriate full duplex communication mode may be configured for the terminal device served by the network device and supporting a full duplex according to the information reported by the terminal device, so that the network device and the terminal device supporting the full duplex adopt the corresponding full duplex communication mode. The problem of interference caused by applying a full duplex technology to cellular networking may be solved, and spectral efficiency of the cellular network may also be improved.

It is to be noted that, in some embodiments of the present disclosure, the network device may send full duplex information supported by the network device to a third terminal device via system information, so that the third terminal device connected with the network device may record the full duplex information supported by the network device. Therefore, in a subsequent process of establishing a connection with a certain network device, the third terminal device may indicate to the certain network device that the third terminal device has recorded full duplex information. For example, the network device supporting the full duplex communication sends full duplex information supported by itself via the system information. The system information may be minimum SI, which may be propagated through a broadcast mechanism. The minimum SI usually includes very critical system information related to a cell selection and an initial access (including obtaining other SI). These system information need to be propagated in a periodic broadcast mode, so that information that needs to be broadcasted and sent is greatly compressed.

As another example, the system information may be other SI. For example, all the other system information except the minimum system information. The other system information is transmitted according to a request of the terminal device or a need of the network device, and may be transmitted by a dedicated signaling, broadcast, or multicast, instead of a continuous periodic transmission, so as to improve resource utilization efficiency.

In an embodiment of the present disclosure, the third terminal device may be a terminal device supporting a full duplex. In other embodiments of the present disclosure, the third terminal device may be a terminal device that does not support a full duplex, but may read system information sent by the network that includes full duplex information of the network device.

For example, assuming that the third terminal device is the terminal device supporting the full duplex. In this way, after the network device sends the full duplex information supported by the network device to the third terminal device via the system information, the third terminal device may read the full duplex information supported by the network device from the system information, so that the full duplex information supported by the network device may be recorded.

As another example, assuming that the third terminal device is the terminal device that does not support the full duplex, but may read the system information sent by the network that includes the full duplex information of the network device. In this way, the network device sends the full duplex information supported by itself via the system information. When receiving the system information including the full duplex information of the network device, the third terminal device may read the full duplex information supported by the network device from the system information.

It is to be noted that, in other embodiments of the present disclosure, the network device may send configuration information to a third terminal device in a connected state. The configuration information is configured to notify the third terminal device to perform measuring and recording for a full duplex when the third terminal device is in an idle state. That is, the network device may notify the third terminal device to record measured full duplex information of the network device when the third terminal device is in the idle state via this configuration. As an example, information measured and recorded by the third terminal device may at least include any one of measuring and recording information about the network device supporting a full duplex communication, measuring and recording information about the network device supporting a full duplex communication and specific full duplex information supported by the network device, measuring and recording information about the network device for a full duplex meeting a certain specific requirement. The full duplex meeting the certain specific requirement may be one or more of supporting a full duplex in one or more specified frequency bands, supporting a full duplex at one or more specified times, or supporting a full duplex in a specific mode, etc.

By implementing the embodiment of the present disclosure, the network device sends the full duplex information supported by itself based on the system information, so that the first terminal device in the idle state may read the full duplex information supported by the network device from the system information, and record the full duplex information supported by the network device after receiving the system information. Alternatively, the network device sends the configuration information to the terminal device in the connected state, and notifies the terminal device to perform measuring and recording for the full duplex when the terminal device is in the idle state via the configuration information, so that the terminal device records measured full duplex information of the network device. In this way, in a subsequent process of establishing a connection with a certain network device, the terminal device may indicate to the network device that the terminal device has recorded full duplex information, so that the network device may know information about a surrounding network device supporting a full duplex, so as to configure an appropriate full duplex communication mode for a terminal served by the network device.

It may be understood that the above-mentioned embodiments describe implementations of the information acquisition method in the embodiment of the present disclosure from a network device side. Embodiments of the present disclosure also provide another information acquisition method, and implementations of the information acquisition method will be described below from a terminal device side. Referring to FIG. 5, FIG. 5 is a flow chart of an information acquisition method provided in an embodiment of the present disclosure. It is to be noted that the information acquisition method in the embodiment of the present disclosure may be applied to a terminal device. As shown in FIG. 5, the information acquisition method may include, but is not limited to, a step as follows.

In step S501, it is indicated to a first network device that the terminal device has recorded full duplex information, in a process of establishing a connection with the first network device.

In some embodiments of the present disclosure, in the process of establishing the connection with the first network device, the terminal device may indicate to the first network device that the terminal device has the recorded full duplex information via a second type of radio resource control (RRC) signaling message. As an example, the recorded full duplex information at least includes information about the network device supporting a full duplex communication, or information about the network device supporting a full duplex communication and corresponding full duplex information, or information about the network device with a specific full duplex condition. The specific full duplex condition may be understood to at least include one or more of supporting a full duplex in one or more specified frequency bands, supporting a full duplex at one or more specified times, or supporting a full duplex in a specific mode, etc.

In an additional implementation, the second type of RRC signaling message may be added to any one of the following signaling messages: a RRC connection setup complete signaling message, a RRC connection reconfiguration complete signaling message, a RRC connection reestablishment complete signaling message, or a RRC connection resume complete signaling message.

It is to be noted that, in cellular networks of different systems, terms corresponding to the RRC connection setup complete signaling message, the RRC connection reconfiguration complete signaling message, the RRC connection reestablishment complete signaling message, or the RRC connection resume complete signaling message, respectively, may be different. For example, in a 4G network, the second type of RRC signaling message may be added to a RRC connection setup complete (RRCConnectionSet-upComplete) signaling message, a RRC connection recon-figuration complete (RRCConnectionReconfigurationCom-plete) signaling message, a RRC connection reestablishment complete (RRCConnectionReestablishmentComplete) sig-naling message, or a RRC connection resume complete (RRCConnectionResumeComplete) signaling message. As another example, in a 5G network, the second type of RRC signaling message may be added to a RRC connection setup complete (RRCSetupComplete) signaling message, a RRC connection reconfiguration complete (RRCReconfiguration-Complete) signaling message, a RRC connection reestab-lishment complete (RRCReestablishmentComplete) signal-ing message, or a RRC connection resume complete (RRCResumeComplete) signaling message.

It is to be noted that, in an embodiment of the present disclosure, the recorded full duplex information may be obtained by reading, by the terminal device, full duplex information sent by the network device and supported by the network device. For example, a second network device supporting a full duplex communication sends the full duplex information supported by the second network device via system information, so that the terminal device in an idle state may read the full duplex information supported by the second network device from the system information after receiving the system information, and record the full duplex information supported by the second network device. In a subsequent process of establishing the connection with the first network device, the terminal device may indicate to the first network device that the terminal device has the recorded full duplex information.

In other embodiments of the present disclosure, the recorded full duplex information may be information about a second network device supporting a full duplex, which is measured and recorded based on a configuration require-ment of the second network device when the terminal device is in an idle state. The first network device and the second network device may refer to a same network device, or may also refer to different network devices. For example, in an embodiment of the present disclosure, the network device that configures a configuration to perform measuring and recording for a full duplex for the terminal device may be a same device as the network device that receives the indica-tion information sent by the terminal device.

For example, the second network device configures a configuration to perform measuring and recording for a full duplex for the terminal device in a connected state. The terminal device in the connected state receives configuration information configured by the second network device via a unicast RRC signaling, and measures and records the infor-mation about the second network device supporting the full duplex based on the configuration information after entering an idle state, so that the terminal device may indicate to the first network device that the terminal device has the recorded full duplex information in the subsequent process of estab-lishing the connection with the first network device. In this way, after receiving the indication sent by the terminal device, the network device may know that the terminal device has the recorded full duplex information, so that the network device may know information about a surrounding network device supporting a full duplex communication, so as to configure an appropriate full duplex communication mode for the terminal device served by the network device and supporting a full duplex. The problem of interference caused by applying a full duplex technology to cellular networking may be solved, and spectral efficiency of the cellular network may also be improved.

By implementing the embodiment of the present disclo-sure, the terminal device indicates to the network device that the terminal device has the recorded full duplex information in the process of establishing the connection with the network device, so that the terminal device may notify the network device of the recorded full duplex information when establishing the connection with the network device, so that the network device may know the information about the surrounding network device supporting the full duplex communication, so as to configure the appropriate full duplex communication mode for the terminal device served by the network device and supporting the full duplex. The problem of interference caused by applying the full duplex technology to the cellular networking may be solved, and spectral efficiency of the cellular network may also be improved.

It is to be noted that the terminal device may receive second indication information sent by the first network device, and report full duplex information required by the first network device to the first network device based on the indication information, so that the first network device may configure an appropriate full duplex communication mode for the terminal device served by the first network device and supporting a full duplex communication according to reported information of the terminal device. Additionally, referring to FIG. 6, FIG. 6 is a flow chart of another information acquisition method provided in an embodiment of the present disclosure. It is to be noted that the informa-tion acquisition method in the embodiment of the present disclosure may be applied to a terminal device. As shown in FIG. 6, the information acquisition method may include, but is not limited to, steps as follows.

In step S601, it is indicated to a first network device that the terminal device has recorded full duplex information, in a process of establishing a connection with the first network device.

In some embodiments of the present disclosure, in the process of establishing the connection with the first network device, the terminal device may indicate to the first network device that the terminal device has the recorded full duplex information via a second type of radio resource control (RRC) signaling message. As an example, the recorded full duplex information at least includes information about the network device supporting a full duplex communication, or information about the network device supporting a full duplex communication and corresponding full duplex infor-mation, or information about the network device with a specific full duplex condition. The specific full duplex condition may be understood to at least include one or more of supporting a full duplex in one or more specified fre-quency bands, supporting a full duplex at one or more specified times, or supporting a full duplex in a specific mode, etc.

In an additional implementation, the second type of RRC signaling message may be added to any one of the following signaling messages: a RRC connection setup complete sig-naling message, a RRC connection reconfiguration complete signaling message, a RRC connection reestablishment com-plete signaling message, or a RRC connection resume com-plete signaling message.

It is to be noted that, in cellular networks of different systems, terms corresponding to the RRC connection setup complete signaling message, the RRC connection reconfigu-ration complete signaling message, the RRC connection reestablishment complete signaling message, or the RRC connection resume complete signaling message, respectively, may be different. For example, in a 4G network, the second type of RRC signaling message may be added to a RRC connection setup complete (RRCConnectionSetupComplete) signaling message, a RRC connection reconfiguration complete (RRCConnectionReconfigurationComplete) signaling message, a RRC connection reestablishment complete (RRCConnectionReestablishmentComplete) signaling message, or a RRC connection resume complete (RRCConnectionResumeComplete) signaling message. As another example, in a 5G network, the second type of RRC signaling message may be added to a RRC connection setup complete (RRCSetupComplete) signaling message, a RRC connection reconfiguration complete (RRCReconfigurationComplete) signaling message, a RRC connection reestablishment complete (RRCReestablishmentComplete) signaling message, or a RRC connection resume complete (RRCResumeComplete) signaling message.

It is to be noted that, in an embodiment of the present disclosure, the recorded full duplex information may be obtained by the terminal device reading full duplex information sent by the network device and supported by the network device. For example, a second network device supporting a full duplex communication sends the full duplex information supported by the second network device via system information, so that the terminal device in an idle state may read the full duplex information supported by the second network device from the system information after receiving the system information, and record the full duplex information supported by the second network device. In a subsequent process of establishing the connection with the first network device, the terminal device may indicate to the first network device that the terminal device has the recorded full duplex information.

In other embodiments of the present disclosure, the recorded full duplex information may be information about a second network device supporting a full duplex, which is measured and recorded based on a configuration requirement of the second network device when the terminal device is in an idle state. The first network device and the second network device may refer to a same network device, or may also refer to different network devices. For example, in an embodiment of the present disclosure, the network device that configures a configuration to perform measuring and recording for a full duplex for the terminal device may be a same device as the network device that receives the indication information sent by the terminal device.

For example, the second network device configures a configuration to perform measuring and recording for a full duplex for the terminal device in a connected state. The terminal device in the connected state receives configuration information configured by the second network device via a unicast RRC signaling, and measures and records the information about the second network device supporting the full duplex based on the configuration information after entering an idle state, so that the terminal device may indicate to the first network device that the terminal device has the recorded full duplex information in the subsequent process of establishing the connection with the first network device. In this way, after receiving the indication sent by the terminal device, the network device may know that the terminal device has the recorded full duplex information, so that the network device may know information about a surrounding network device supporting a full duplex communication, so as to configure an appropriate full duplex communication mode for the terminal device served by the network device and supporting a full duplex. The problem of interference caused by applying a full duplex technology to cellular networking may be solved, and spectral efficiency of the cellular network may also be improved.

In step S602, second indication information sent by the first network device is received, in which the second indication information is configured to indicate the terminal device to report full duplex information required by the first network device.

Additionally, the first network device receives the first indication information sent by the terminal device, in which the first indication information is configured to indicate to the first network device that the terminal device has the recorded full duplex information. After receiving the first indication information sent by the terminal device, the first network device indicates the terminal device to report the full duplex information required by the first network device via a first type of radio resource control (RRC) signaling message, according to a requirement of the first network device. The first type of RRC signaling message may be added to a user equipment information request signaling message.

In step S603, reported information is sent to the first network device based on the second indication information.

Additionally, after receiving indication (such as the above-mentioned second indication information) sent by the first network device, the terminal device may report the full duplex information according to the requirement of the first network device, and the reported information may be transmitted via the user equipment information request signaling message. After receiving the full duplex information reported by the terminal device, the first network device may configure an appropriate full duplex communication mode for the terminal device served by the first network device and supporting a full duplex communication according to the information.

By implementing the embodiment of the present disclosure, the full duplex information may be reported according to the requirement of the network device, so that the network device may configure an appropriate full duplex communication mode for the terminal device served by the network device and supporting a full duplex according to the information after receiving the full duplex information reported by the terminal device, so that the network device and the terminal device supporting the full duplex adopt the corresponding full duplex communication mode. The problem of interference caused by applying the full duplex technology to the cellular networking may be solved, and spectral efficiency of the cellular network may also be improved.

In the above-mentioned embodiments provided in the present disclosure, the methods provided in the embodiments of the present disclosure are introduced from perspectives of the network device and the terminal device, respectively. In order to realize various functions in the method provided in the above-mentioned embodiment of the present disclosure, the network device and the terminal device may include a hardware structure and a software module, and the above-mentioned various functions are realized in a form of a hardware structure, a software module, or a hardware structure plus a software module. A certain function in the above-mentioned various functions may be implemented in a form of a hardware structure, a software module, or a hardware structure plus a software module.

Referring to FIG. 7, FIG. 7 is a schematic diagram of a communication apparatus 70 provided in an embodiment of the present disclosure. The communication apparatus 70 shown in FIG. 7 may include a transceiver module 701 and a processing module 702. The transceiver module 701 may include a sending module and/or a receiving module. The sending module is configured to realize a sending function, and the receiving module is configured to realize a receiving function. The transceiver module 701 may realize a sending function and/or a receiving function.

The communication apparatus 70 may be a network device, may also be an apparatus in a network device, and may also be an apparatus that may be used in matching with a network device. Alternatively, the communication apparatus 70 may be a terminal device, may also be an apparatus in a terminal device, and may also be an apparatus that may be used in matching with the terminal device.

The communication apparatus 70 is a network device. In an embodiment of the present disclosure, the transceiver module 701 is configured to receive first indication information sent by a first terminal device, in which the first indication information is configured to indicate to a network device that the first terminal device has recorded full duplex information.

In an implementation, the recorded full duplex information is information about the network device supporting a full duplex communication, which is measured and recorded based on a configuration requirement of the network device when the first terminal device is in an idle state.

In an additional implementation, the processing module 702 is configured to indicate the first terminal device to report full duplex information required by the network device, in response to the first indication information received. The transceiver module 701 is further configured to receive reported information sent by the first terminal device based on the indication.

Additionally, the processing module 702 is further used to configure a corresponding full duplex communication mode for a second terminal device served by the network device according to the reported information, in which the second terminal device is a terminal device supporting a full duplex communication.

As an example, the processing module 702 is specifically configured to indicate the first terminal device to report the full duplex information required by the network device via a first type of radio resource control (RRC) signaling message, according to a requirement of the network device. The first type of RRC signaling message is added to a user equipment information request signaling message.

In an implementation, the transceiver module 701 is further configured to send full duplex information supported by the network device to a third terminal device via system information. The system information is system information or other system information.

Additionally, the transceiver module 701 is further configured to send configuration information to a third terminal device in a connected state, in which the configuration information is configured to notify the third terminal device to perform measuring and recording for a full duplex when the third terminal device is in an idle state.

In an additional implementation, the recorded full duplex information at least includes information about the network device supporting a full duplex communication, or information about the network device supporting a full duplex communication and corresponding full duplex information, or information about the network device with a specific full duplex condition.

The communication apparatus 70 is a terminal device. The processing module 702 is configured to indicate to a first network device that a terminal device has recorded full duplex information, in a process of establishing a connection with the first network device.

In an implementation, the recorded full duplex information is information about a second network device supporting a full duplex, which is measured and recorded based on a configuration requirement of the second network device when the terminal device is in an idle state.

In an additional implementation, the processing module 702 is specifically configured to indicate to the first network device that the terminal device has the recorded full duplex information via a second type of radio resource control (RRC) signaling message. The second type of RRC signaling message is added to any one of the following signaling messages a RRC connection setup complete signaling message, a RRC connection reconfiguration complete signaling message, a RRC connection reestablishment complete signaling message, or a RRC connection resume complete signaling message.

In an implementation, the transceiver module 701 is configured to receive second indication information sent by the first network device, in which the second indication information is configured to indicate the terminal device to report full duplex information required by the first network device, and send reported information to the first network device based on the second indication information. Additionally, the first network device is used to configure a corresponding full duplex communication mode for the terminal device supporting a full duplex communication served by the first network device according to the reported information. As an example, the reported information is transmitted via a user equipment information response signaling message.

In an implementation, the transceiver module 701 is further configured to receive full duplex information supported by the second network device and sent by the second network device via system information.

In an additional implementation, the transceiver module 701 is further configured to receive configuration information configured by the second network device via a unicast RRC signaling. The processing module 702 is further configured to measure and record the information about the second network device supporting the full duplex based on the configuration information, after the terminal device enters the idle state.

Additionally, the recorded full duplex information at least includes information about the network device supporting a full duplex communication, or information about the network device supporting a full duplex communication and corresponding full duplex information, or information about the network device with a specific full duplex condition.

With respect to the apparatus in the above-mentioned embodiment, the specific manners for performing operations for individual modules therein have been described in detail in the embodiments regarding the method, which will not be elaborated herein.

Referring to FIG. 8, FIG. 8 is a schematic diagram of another communication apparatus 80 provided in an embodiment of the present disclosure. The communication apparatus 80 may be a network device, may be a terminal device, may be a chip, a chip system, or a processor that supports the network device to implement the above-mentioned method, and may also be a chip, a chip system, or a processor that supports the terminal device to implement the above-mentioned method. The apparatus may be configured to implement the method described in the above-mentioned method embodiment. For details, reference may be made to the description in the above-mentioned method embodiment.

The communication apparatus 80 may include one or more processors 801. The processor 801 may be a generic processor, a specific processor, or the like. For example, the processor 801 may be a baseband processor or a central processor. The baseband processor may be configured to process a communication protocol and communication data, and the central processor may be configured to control a communication device (such as, a base station, a baseband chip, a terminal, a terminal chip, a DU, or a CU, etc.), execute computer programs, and process data of the computer programs.

Additionally, the communication apparatus 80 may further include one or more memories 802, on which a computer program 804 may be stored, and the processor 801 executes the computer program 804, so that the communication apparatus 80 executes the method described in the above-mentioned method embodiments. Additionally, data may also be stored in the memory 802. The communication apparatus 80 and the memory 802 may be set separately or integrated together.

Additionally, the communication apparatus 80 may further include a transceiver 805 and an antenna 806. The transceiver 805 may be referred to as a transceiver unit, a transceiver machine, or a transceiver circuit, etc., and is configured to realize a transceiver function. The transceiver 805 may include a receiver and a transmitter. The receiver may be referred to as a receiver machine or a receiving circuit, etc., for realizing a receiving function. The transmitter may be referred to as a transmitting machine or a transmitting circuit, etc., and is configured to realize a transmitting function.

Additionally, the communication apparatus 80 may further include one or more interface circuits 807. The interface circuit 807 is configured to receive code instructions and transmit the code instructions to the processor 801. The processor 801 executes the code instructions to enable the communication apparatus 80 to perform the method described in the above-mentioned method embodiments.

The communication apparatus 80 is a network device. The transceiver 805 is configured to execute step S201 in FIG. 2, execute step S301 and step S303 in FIG. 3, execute step S401 and step S403 in FIG. 4, and execute step "sending full duplex information supported by the network device to a third terminal device via system information" and step "sending configuration information to a third terminal device in a connected state, in which the configuration information is configured to notify the third terminal device to perform measuring and recording for a full duplex when the third terminal device is in an idle state". The processor 801 is configured to execute step S302 in FIG. 3, execute step S402 and step S404 in FIG. 4, and execute step "indicating the first terminal device to report the full duplex information required by the network device via a first type of radio resource control (RRC) signaling message, according to a requirement of the network device".

The communication apparatus 80 is a terminal device. The processor 801 is configured to execute step S501 in FIG. 5, execute step S601 in FIG. 6, execute step "measuring and recording the information about the second network device supporting the full duplex based on the configuration information, after the terminal device enters the idle state", and execute step "indicating to the first network device that the terminal device has the recorded full duplex information via a second type of radio resource control (RRC) signaling message". The transceiver 805 is configured to execute step S602 and step S602 in FIG. 6, execute step "receiving full duplex information supported by the second network device and sent by the second network device via system information", and execute step "receiving configuration information configured by the second network device via a unicast RRC signaling".

In an implementation, the processor 801 may include a transceiver configured to receive and transmit functions. For example, the transceiver may be a transceiver circuit, an interface, or an interface circuit. The transceiver circuit, the interface, or the interface circuit configured to receive and transmit the functions may be separated or integrated together. The transceiver circuit, the interface, or the interface circuit may be configured to read and write codes/data, or the transceiver circuit, the interface, or the interface circuit may be configured for signal transmission or transfer.

In an implementation, the memory 802 may store a computer program 804, and the computer program 804 runs on the processor 801, which may cause the communication apparatus 80 to execute the method described in the above-mentioned method embodiments. The computer program 804 may be solidified in the processor 801, and in this case, the processor 801 may be implemented by hardware.

In an implementation, the communication apparatus 180 may include a circuit, and the circuit may realize a function of transmitting, receiving or communicating in the above-mentioned method embodiments. The processor and transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, and the like. The processor and the transceiver may also be manufactured by using various IC process technologies, such as complementary metal oxide semiconductor (CMOS), an nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication apparatus described in the above-mentioned embodiment may be the network device or the terminal device, but the scope of the communication apparatus described in the present disclosure is not limited thereto, and a structure of the communication apparatus may not be limited by FIG. 8. The communication apparatus may be a stand-alone device or may be part of a larger device. For example, the communication apparatus may be: (1) a stand-alone integrated circuit (IC), a chip, or a chip system or a subsystem, (2) a set of one or more ICs, additionally, the set of the IC may also include storage components for storing data and computer programs, (3) an ASIC, such as a modem, (4) a module that may be embedded in other devices, (5) a receiver, a terminal, an intelligent terminal, a cellular phone, a wireless device, a handset, a mobile unit, a vehicle-mounted device, a network device, a cloud equipment, an artificial intelligence device, etc., (6) other devices, and so on.

Those skilled in the art may also understand that various illustrative logical blocks and steps listed in the embodiments of the present disclosure may be implemented by an electronic hardware, a computer software, or a combination thereof. Whether this function is realized by a hardware or a software depends on a specific application and design requirements of the whole system. Those skilled in the art may use various methods to realize the described functions for each specific application, but this realization should not be understood as beyond the scope of protection of the embodiments of the present disclosure.

The embodiment of the present disclosure also provides a communication system. The system includes the communication apparatus as the terminal device and the communication apparatus as the network device in the embodiment of FIG. 7. Alternatively, the system includes the communication apparatus as the terminal device and the communication apparatus as the network device in the embodiment of FIG. 8.

The present disclosure also provides a computer-readable storage medium having stored therein instructions that, when executed by a computer, cause functions of any one of the above-mentioned method embodiments to be implemented.

The present disclosure also provides a computer program product that, when executed by a computer, cause functions of any one of the above-mentioned method embodiments to be implemented.

In the above-mentioned embodiments, all or part of the functions may be realized by a software, a hardware, a firmware or any combination thereof. When the functions is realized by using a software, all or part of the functions may be realized in a form of a computer program product. The computer program product includes one or more computer programs. When the computer program is loaded and executed on a computer, all or part of the functions is generated according to the processes or functions the embodiments of the present disclosure. The computer may be a generic computer, a specific computer, a computer network, or other programmable devices. The computer program may be stored in the computer-readable storage medium or transmitted from one computer-readable storage medium to another computer-readable storage medium. For example, the computer program may be transmitted from a website, a computer, a server or a data center to another website, another computer, another server or another data center in a wired (for example, a coaxial cable, an optical fiber, a digital subscriber line (DSL)) or wireless (for example, infrared, wireless, microwave, etc.) manner. The computer-readable storage medium may be any available medium that may be accessed by a computer or integrated with a data storage device such as a server, a data center that contains one or more available media. The available medium may be a magnetic medium (for example, a floppy disk, a hard disk, a magnetic tape), an optical medium (for example, a high-density digital video disc (DVD)), or a semiconductor medium (for example, a solid state disk (SSD)), etc.

Embodiments of the present disclosure provide an information acquisition method, an information acquisition apparatus, and a storage medium, which may be applicable to a long term evolution (LTE) system and a new radio (5G/NR) system, so that a network device may know full duplex information of a surrounding network device. The problem of interference caused by applying a full duplex technology to a cellular networking may be solved, and spectral efficiency of a cellular network may also be improved.

In a first aspect, an embodiment of the present disclosure provides an information acquisition method, applied to a network device, and the method includes receiving first indication information sent by a first terminal device, in which the first indication information is configured to indicate to the network device that the first terminal device has recorded full duplex information.

In this technical solution, the terminal device indicates to the network device that the terminal device has recorded network device information supporting a full duplex communication, so that the network device may know information about a surrounding network device supporting the full duplex communication, so as to configure an appropriate full duplex communication mode for the terminal device served by the network device and supporting a full duplex. The problem of interference caused by applying a full duplex technology to cellular networking may be solved, and spectral efficiency of a cellular network may also be improved.

In an implementation, the recorded full duplex information is information about the network device supporting a full duplex communication, which is measured and recorded based on a configuration requirement of the network device when the first terminal device is in an idle state.

In this technical solution, the terminal device records measured full duplex information of a certain network device when the terminal device is in an idle state. Therefore, when establishing a connection with the network device, the terminal device notifies the network device of recorded full duplex information, so that the network device may know the information about the surrounding network device supporting the full duplex communication.

In an additional implementation, the method further includes indicating the first terminal device to report full duplex information required by the network device, in response to the first indication information received, and receiving reported information sent by the first terminal device based on the indication.

In this technical solution, since the full duplex information is recorded in the terminal device, the network device may indicate the terminal device to report the full duplex information required by the network device, so that the terminal device may report the full duplex information to the network device based on the indication.

In an additional implementation, the method further includes configuring a corresponding full duplex communication mode for a second terminal device served by the network device according to the reported information, in which the second terminal device is a terminal device supporting a full duplex communication.

In this technical solution, the network device configures the appropriate full duplex communication mode for the terminal device served by the network device and supporting the full duplex according to the information reported by the terminal device, so that the network device and the terminal device supporting the full duplex adopt the corresponding full duplex communication mode. The problem of interference caused by applying the full duplex technology to the cellular networking may be solved, and the spectral efficiency of the cellular network may also be improved.

In an additional implementation, indicating the first terminal device to report the full duplex information required by the network device includes indicating the first terminal device to report the full duplex information required by the network device via a first type of radio resource control (RRC) signaling message, according to a requirement of the network device.

Additionally, the first type of RRC signaling message is added to a user equipment information request signaling message.

In an implementation, the method further includes sending full duplex information supported by the network device to a third terminal device via system information.

Additionally, the method further includes sending configuration information to a third terminal device in a connected state, in which the configuration information is configured to notify the third terminal device to perform measuring and recording for a full duplex when the third terminal device is in an idle state.

In this technical solution, the network device sends the full duplex information supported by itself based on the system information, and sends the configuration information to the terminal device in the connected state, and notifies the terminal device to perform measuring and recording for the full duplex when the terminal device is in the idle state via the configuration information, so that the terminal device records measured full duplex information of the network device. In this way, in a subsequent process of establishing a connection with a certain network device, the terminal device may indicate to the network device that the terminal device has the recorded full duplex information, so that the network device may know that the information about the surrounding network device supporting the full duplex, so as to configure the appropriate full duplex communication mode for the terminal served by the network device.

In an additional implementation, the system information is minimum system information or other system information.

In an implementation, the recorded full duplex information at least includes information about the network device supporting a full duplex communication, or information about the network device supporting a full duplex communication and corresponding full duplex information, or information about the network device with a specific full duplex condition.

In a second aspect, an embodiment of the present disclosure provides another information acquisition method, applied to a terminal device, and the method includes indicating to a first network device that the terminal device has recorded full duplex information, in a process of establishing a connection with the first network device.

In this technical solution, the terminal device indicates to the network device that the terminal device has the recorded full duplex information, in the process of establishing the connection with the network device. Therefore, when establishing the connection with the network device, the terminal device notifies the network device of the recorded full duplex information, so that the network device may know information about a surrounding network device supporting a full duplex communication.

In an implementation, the recorded full duplex information is information about a second network device supporting a full duplex, which is measured and recorded based on a configuration requirement of the second network device when the terminal device is in an idle state.

In this technical solution, the information about the network device supporting the full duplex is measured and recorded based on the configuration requirement of the network device when the terminal device is in the idle state, so that the terminal device may indicate to a certain network device that the terminal device has the recorded full duplex information in a subsequent process of establishing a connection with the network device. Therefore, when establishing the connection with the network device, the terminal device notifies the network device of the recorded full duplex information, so that the network device may know the information about the surrounding network device supporting the full duplex communication.

In an implementation, indicating to the first network device that the terminal device has the recorded full duplex information includes indicating to the first network device that the terminal device has the recorded full duplex information via a second type of radio resource control (RRC) signaling message.

Additionally, the second type of RRC signaling message is added to any one of the following signaling messages a RRC connection setup complete signaling message, a RRC connection reconfiguration complete signaling message, a RRC connection reestablishment complete signaling message, or a RRC connection resume complete signaling message.

In an implementation, the method further includes receiving second indication information sent by the first network device, in which the second indication information is configured to indicate the terminal device to report full duplex information required by the first network device, and sending reported information to the first network device based on the second indication information.

In this technical solution, since the full duplex information is recorded in the terminal device, the network device may indicate the terminal device to report the full duplex information required by the network device, so that the terminal device may report the full duplex information to the network device based on the indication.

In an additional implementation, the first network device is used to configure a corresponding full duplex communication mode for the terminal device supporting a full duplex communication served by the first network device according to the reported information.

Additionally, the reported information is transmitted via a user equipment information response signaling message.

In this technical solution, the network device configures an appropriate full duplex communication mode for the terminal device served by the network device and supporting the full duplex according to the information reported by the terminal device, so that the network device and the terminal device supporting the full duplex adopt the corresponding full duplex communication mode. The problem of interference caused by applying a full duplex technology to cellular networking may be solved, and spectral efficiency of the cellular network may also be improved.

In an implementation, measuring and recording the information about the second network device supporting the full duplex based on the configuration requirement of the second network device when the terminal device is in the idle state includes receiving, by the terminal device, full duplex information supported by the second network device and sent by the second network device via system information.

In an additional implementation, measuring and recording the information about the second network device supporting the full duplex based on the configuration requirement of the second network device when the terminal device is in the idle state includes receiving, by the terminal device, configuration information configured by the second network device via a unicast RRC signaling, and measuring and recording the information about the second network device supporting the full duplex based on the configuration information, after the terminal device enters the idle state.

In this technical solution, the network device sends the full duplex information supported by itself based on the system information, and sends the configuration information to the terminal device in the connected state, and notifies the terminal device to perform measuring and recording for the full duplex when the terminal device is in the idle state via the configuration information, so that the terminal device records measured full duplex information of the network device. In this way, in a subsequent process of establishing a connection with a certain network device, the terminal device may indicate to the network device that the terminal device has the recorded full duplex information, so that the network device may know that the information about the surrounding network device supporting the full duplex, so as to configure the appropriate full duplex communication mode for the terminal served by the network device.

Additionally, the recorded full duplex information at least includes information about the network device supporting a full duplex communication, or information about the network device supporting a full duplex communication and corresponding full duplex information, or information about the network device with a specific full duplex condition.

In a third aspect, an embodiment of the present disclosure provides a communication apparatus. The apparatus has some or all of the functions to implement the network apparatus in the method described in the first aspect above. For example, the functions of the communication apparatus may have some or all of the functions in the embodiments of the present disclosure, or may have the functions of any one of the embodiments of the present disclosure alone. The functions may be implemented by hardware, or may be implemented by hardware executing corresponding software. The hardware or software includes one or more units or modules corresponding to the above-mentioned functions.

In an implementation, a structure of the communication apparatus may include a transceiver module and a processing module. The processing module is configured to support the communication apparatus to perform corresponding functions in the above-mentioned method. The transceiver module is configured to support a communication between the communication apparatus and other apparatuses. The communication apparatus may further include a storage module. The storage module is configured to be coupled with the transceiver module and the processing module, and stores necessary computer programs and data of the communication apparatus.

As an example, the processing module may be a processor, the transceiver module may be a transceiver or a communication interface, and the storage module may be a memory.

In the fourth aspect, the embodiment of the present disclosure provides another communication apparatus. The communication apparatus has some or all of the functions to implement the terminal apparatus in the method example described in the second aspect above. For example, the functions of the communication apparatus may have some or all of the functions in the embodiments of the present disclosure, or may have the functions of any one of the embodiments of the present disclosure alone. The functions may be implemented by hardware, or may be implemented by hardware executing corresponding software. The hardware or software includes one or more units or modules corresponding to the above-mentioned functions.

In an implementation, a structure of the communication apparatus may include a transceiver module and a processing module. The processing module is configured to support the communication apparatus to perform corresponding functions in the above-mentioned method. The transceiver module is configured to support a communication between the communication apparatus and other apparatuses. The communication apparatus may further include a storage module. The storage module is configured to be coupled with the transceiver module and the processing module, and stores necessary computer programs and data of the communication apparatus.

As an example, the processing module may be a processor, the transceiver module may be a transceiver or a communication interface, and the storage module may be a memory.

In a fifth aspect, an embodiment of the present disclosure provides a communication device. The communication device includes a processor that, when invoking a computer program in a memory, cause the method described in the first aspect to be implemented.

In a sixth aspect, an embodiment of the present disclosure provides a communication device. The communication device includes a processor that, when invoking a computer program in a memory, cause the method described in the second aspect to be implemented.

In a seventh aspect, an embodiment of the present disclosure provides a communication device. The communication device includes a processor, and a memory having stored therein computer programs. The processor is configured to execute the computer programs stored in the memory to cause the communication device to perform the method described in the first aspect.

In an eighth aspect, an embodiment of the present disclosure provides a communication device. The communication device includes a processor, and a memory having stored therein computer programs. The processor is configured to execute the computer programs stored in the memory to cause the communication device to perform the method described in the second aspect.

In a ninth aspect, an embodiment of the present disclosure provides a communication device. The communication device includes an interface circuit. The interface circuit is configured to receive code instructions and transmit the code instructions to a processor, and the processor is configured to execute the code instructions to execute the method described in the first aspect.

In a tenth aspect, an embodiment of the present disclosure provides a communication device. The communication device includes an interface circuit. The interface circuit is configured to receive code instructions and transmit the code instructions to a processor, and the processor is configured to execute the code instructions to execute the method described in the second aspect.

In an eleventh aspect, an embodiment of the present disclosure provides a communication system. The system includes the communication apparatus described in the third aspect and the communication apparatus described in the fourth aspect. Alternatively, the system includes the communication device described in the fifth aspect and the communication device described in the sixth aspect. Alternatively, the system includes the communication device described in the seventh aspect and the communication device described in the eighth aspect. Alternatively, the system includes the communication device described in the ninth aspect and the communication device described in the tenth aspect.

In a twelfth aspect, an embodiment of the present invention provides a computer-readable storage medium having stored therein instructions used for the communication device that, when executed, cause the communication device to perform the method described in the first aspect.

In a thirteenth aspect, an embodiment of the present invention provides a readable storage medium having stored therein instructions used for the communication device that, when executed, cause the communication device to perform the method described in the second aspect.

In a fourteenth aspect, the present disclosure also provides a computer program product. The computer program product includes a computer program that, when run on a computer, causes the computer to perform the method described in the first aspect.

In a fifteenth aspect, the present disclosure also provides a computer program product. The computer program product includes a computer program that, when run on a computer, causes the computer to perform the method described in the second aspect.

In a sixteenth aspect, the present disclosure provides a computer program that, when run on a computer, causes the computer to perform the method described in the first aspect.

In a seventeenth aspect, the present disclosure provides a computer program that, when run on a computer, causes the computer to perform the method described in the second aspect.

It may be understood by those of ordinary skill in the art that numerical numbers such as the first, the second and the like involved in the present disclosure are merely a convenient distinction for description, and are not used to limit the scope of the embodiments of the present disclosure, but also indicate the sequence.

At least one of the present disclosure may also be described as one or plurality, and the plurality may be two, three, four or more, which is not limited in the present disclosure. In an embodiment of the present disclosure, for one technical feature, a technical feature in the technical feature is distinguished by "first," "second," "third," "A," "B," "C," and "D". There is no precedence or magnitude order between the technical features described by "first," "second," "third," "A," "B," "C," and "D".

A correspondence shown in each table in the present disclosure may be configured or predefined. Values of the information in each table are merely examples, and may be configured as other values, which is not limited in the present disclosure. When configuring a correspondence between information and parameters, it is not necessary to configure all correspondences shown in each table. For example, in the table in the present disclosure, a correspondence shown in some rows may not be configured. For another example, appropriate deformation adjustments may be made based on the above-mentioned table, such as splitting, merging, and so on. Names of the parameters shown in the titles of the above-mentioned tables may also adopt other names that may be understood by the communication device, and values or representations of the parameters may also be other values or representations that may be understood by the communication device. Other data structures may also be adopted when the above-mentioned tables are implemented, such as arrays, queues, containers, stacks, linear tables, pointers, linked lists, trees, graphs, structures, classes, heaps, hash tables, etc.

The pre-definition in the present disclosure may be understood as definition, definition in advance, storage, pre-storage, pre-negotiation, pre-configuration, curing, or pre-firing.

Those of ordinary skill in the art may appreciate that units and algorithm steps of various examples described in conjunction with the embodiments disclosed herein may be implemented in an electronic hardware, or a combination of a computer software and the electronic hardware. Whether these functions are executed in a hardware or a software depends on the specific application and design constraints of the technical solution. Those skilled in the art may use different methods to implement the described functions for each specific application, but such implementation should not be considered beyond the scope of the present disclosure.

It may be clearly understood by those skilled in the art that for the convenience and conciseness of the description, specific working processes of the above-described systems, the apparatuses and the units may refer to corresponding processes in the above-mentioned method embodiments, which will not be elaborated herein.

The above is merely the specific implementation of the present disclosure, and the scope of the protection of the present disclosure is not limited thereto. Changes or substitutions will readily occur to those skilled in the art within the technical scope of the present disclosure, which is to be covered the scope of protection of the present disclosure. Therefore, the scope of protection of the present disclosure is as set forth in the scope of protection of the claims.

What is claimed is:

1. An information acquisition method, applied to a network device, comprising:
   receiving first indication information sent by a first terminal device;
   wherein the first indication information is configured to indicate to the network device that the first terminal device has recorded full duplex information;
   wherein the recorded full duplex information is information about the network device supporting a full duplex communication, which is measured and recorded based on a configuration requirement of the network device when the first terminal device is in an idle state.

2. The method of claim 1, further comprising:
   indicating the first terminal device to report full duplex information required by the network device, in response to the first indication information received; and
   receiving reported information sent by the first terminal device based on the indication.

3. The method of claim 2, further comprising:
   configuring a corresponding full duplex communication mode for a second terminal device served by the network device according to the reported information;
   wherein the second terminal device is a terminal device supporting a full duplex communication.

4. The method of claim 2, wherein indicating the first terminal device to report the full duplex information required by the network device comprises:
   indicating the first terminal device to report the full duplex information required by the network device via a first type of radio resource control (RRC) signaling message, according to a requirement of the network device.

5. The method of claim 4, wherein the first type of RRC signaling message is added to a user equipment information request signaling message.

6. The method of claim 1, further comprising:
   sending full duplex information supported by the network device to a second terminal device via system information.

7. The method of claim 6, wherein the system information is minimum system information or other system information.

8. The method of claim 1, further comprising:
   sending configuration information to a second terminal device in a connected state, wherein the configuration information is configured to notify the second terminal device to perform measuring and recording for a full duplex when the second terminal device is in an idle state.

9. The method of claim 1, wherein the recorded full duplex information at least comprises:
   information about the network device supporting a full duplex communication; or information about the network device supporting a full duplex communication and corresponding full duplex information; or information about the network device with a specific full duplex condition.

10. An information acquisition method, applied to a terminal device, comprising:

indicating to a first network device that the terminal device has recorded full duplex information, in a process of establishing a connection with the first network device;

wherein the recorded full duplex information is information about a second network device supporting a full duplex, which is measured and recorded based on a configuration requirement of the second network device when the terminal device is in an idle state.

11. The method of claim 10, wherein indicating to the first network device that the terminal device has the recorded full duplex information comprises:

indicating to the first network device that the terminal device has the recorded full duplex information via a first type of radio resource control (RRC) signaling message.

12. The method of claim 11, wherein the first type of RRC signaling message is added to any one of the following signaling messages:

a RRC connection setup complete signaling message;

a RRC connection reconfiguration complete signaling message;

a RRC connection reestablishment complete signaling message; or a RRC connection resume complete signaling message.

13. The method of claim 10, further comprising:

receiving second indication information sent by the first network device; wherein the second indication information is configured to indicate the terminal device to report full duplex information required by the first network device; and sending reported information to the first network device based on the second indication information.

14. The method of claim 13, wherein the first network device is used to configure a corresponding full duplex communication mode for the terminal device supporting a full duplex communication served by the first network device according to the reported information.

15. The method of claim 13, wherein the reported information is transmitted via a user equipment information response signaling message.

16. The method of claim 10, wherein measuring and recording the information about the second network device supporting the full duplex based on the configuration requirement of the second network device when the terminal device is in the idle state comprises:

receiving, by the terminal device, full duplex information supported by the second network device and sent by the second network device via system information.

17. The method of claim 10, wherein measuring and recording the information about the second network device supporting the full duplex based on the configuration requirement of the second network device when the terminal device is in the idle state comprises:

receiving, by the terminal device, configuration information configured by the second network device via a unicast radio resource control (RRC) signaling; and measuring and recording the information about the second network device supporting the full duplex based on the configuration information, after the terminal device enters the idle state.

18. A communication device, comprising:

a processor; and a memory having stored therein computer programs, wherein the processor is configured to:

receive first indication information sent by a first terminal device;

wherein the first indication information is configured to indicate to the communication device that the first terminal device has recorded full duplex information;

wherein the recorded full duplex information is information about the network device supporting a full duplex communication, which is measured and recorded based on a configuration requirement of the network device when the first terminal device is in an idle state.

* * * * *